United States Patent
McCormack et al.

[19]

[11] Patent Number: 6,154,705
[45] Date of Patent: Nov. 28, 2000

[54] SYSTEM FOR ATTENUATING HIGH ORDER FREE SURFACE MULTIPLES FROM A SEISMIC SHOT RECORD USING A GENETIC PROCEDURE

[75] Inventors: Michael D. McCormack, Plano; Kelly Crawford, Allen, both of Tex.

[73] Assignee: Atlantic Richfield Company, Los Angeles, Calif.

[21] Appl. No.: 09/347,760

[22] Filed: Jul. 6, 1999

Related U.S. Application Data

[63] Continuation-in-part of application No. 09/140,121, Aug. 25, 1998, which is a continuation-in-part of application No. 08/818,733, Mar. 14, 1997, Pat. No. 5,924,048.

[51] Int. Cl.[7] .................................................. G01V 1/28
[52] U.S. Cl. .............................................................. 702/17
[58] Field of Search ........................ 702/14–18; 706/929

[56] References Cited

U.S. PATENT DOCUMENTS

| | | |
|---|---|---|
| 5,255,345 | 10/1993 | Shaefer . |
| 5,319,781 | 6/1994 | Syswerda . |
| 5,390,282 | 2/1995 | Koza et al. . |
| 5,541,848 | 7/1996 | McCormack et al. . |
| 5,924,048 | 7/1999 | McCormack et al. . |

OTHER PUBLICATIONS

Prentice–Hall, Inc., Craft, B.C. and Hawkins, M.F., *Applied Petroleum Reservoir Engineering*, 1959 Ch. 4, p. 148–156.
McGraw–Hill Book Company, Amyz, James W., Bass, Daniel M., Jr. and Whiting, Robert L., 1960 *Petroleum Reservoir Engineering Physical Properties*, Ch. 8, p. 561–598.

Lawton, George, Genetic Algorithms for Schedule Optimization, May 1992.

Diniz, L.S., Application of a genetic algorithm for calibration and structural modification of Tank Model, p. 11–20, No Date.

Wong, Patrick M., Gedeon, Tamas D., and Taggart, Ian J., An Improved Technique in Porosity Prediction: A Neural Network Approach, Jul. 1995, IEEE Trans. On Geoscience & Remote Sensing, vol. 33, No. 4, p. 971–980.

Lunn, Ken, Spatial Reasoning With Genetic Algorithms An Application in Planning of Safe Liquid Petroleum Gas Sites, p. 74–84, No Date.

*Primary Examiner*—Donald E. McElheny, Jr.
*Attorney, Agent, or Firm*—Haynes and Boone LLP

[57] ABSTRACT

A system and method is provided for estimating the inverse source wavelet of a seismic shot record for improved accuracy and efficiency in removing high order free surface multiples from the shot record, using a stochastic optimization technique, such as a genetic algorithm procedure, that can more readily accommodate non-linear aspects of this problem. The system and method is applied to a set of measured seismic field data, $D_o(x,t)$, with primary reflections and free surface multiples, where removal of the free surface multiples is determined utilizing an estimate of the inverse of the source wavelet and scale factors made from the seismic data. The system and method automatically optimizes estimates for the inverse of the source wavelet and scale factors.

10 Claims, 6 Drawing Sheets

Fig. 1

Fig. 2a
CROSS-SECTION OF EARTH

Fig. 2b
SEISMIC DATA RECORDING $D_0(x,t)$

Fig. 3a INVERSE SEISMIC WAVELT

SYSTEM FOR ATTENUATING HIGH ORDER FREE SURFACE MULTIPLES FROM A SEISMIC SHOT RECORD USING A GENETIC PROCEDURE

CROSS-REFERENCE TO RELATED APPLICATION

This application is a continuation-in-part of co-pending U.S. patent application Ser. No. 09/140,121, filed Aug. 25, 1998, which is a continuation-in-part of application Ser. No. 08/818,733, filed Mar. 14, 1997, U.S. Pat. No. 5,924,048, all assigned to the assignee of the present application.

BACKGROUND OF THE INVENTION

The invention relates generally to processing of numerical data which characterize subsurface earth formations. More particularly, the invention relates to a method and a system for removing high order free surface multiples from a seismic shot record using a genetic algorithm.

A seismic record normally registers several different types of signals and noises during acquisition of the data. Primary reflections, representing seismic energy that has been reflected once from an interface in the subsurface, are the events that are used to map the subsurface. During seismic processing it is important to remove those recorded events that interfere with the primary seismic energy. One of the most important seismic noises that must be attenuated in processing is that of multiple events. Multiple events are generated when seismic energy undergoes three or moire reflections in the subsurface. Surface multiple energy arises when seismic energy which has been reflected one or more times in the subsurface, and is returning upward towards the surface, is reflected back into the subsurface by the normally large reflectivity of the air-surface interface, then is reflected back again towards the surface, and then is recorded. Internal multiple energy refers to any seismic event that has undergone multiple reflections from two or more interfaces into the subsurface. The problem addressed herein is concerned with the removal of surface multiple energy only.

Accordingly, given a set of measured seismic field data, $D_o(x,t)$, with primary reflections and free surface multiples, improved techniques are desired for determining a new data set, $D_p(x,t)$, that contains primaries-only reflection events. Traditional techniques for supressing free surface multiples involve calculations utilizing an estimate of the inverse of the source wavelet made from the seismic data, and utilizing linear estimation techniques that are both complicated to automate and inaccurate. Other techniques employ nonlinear optimization techniques to find a suitable solution to the inverse source waveform. Notable among these is the work of Carvalho who used a simulated annealing algorithm to extract the inverse wavelet. See Paulo M. Carvalho and Arthur B. Weglein, *Wavelet Estimation for Surface Multiple Attenuation Using a Simulated Annealing Algorithm*, Sixty Fourth Annual Int'l Meeting, Soc'y of Exploration Geophysicists, Expanded Abstracts 1481–84 (1994).

By way of further background, optimization methods known as "genetic algorithms" have been applied to non-linear problems in many diverse areas, including operation of a gas pipeline, factory scheduling and semiconductor layout. Genetic algorithms serve to select a string (referred to as a "chromosome") of numbers ("genes") having values ("alleles") that provides he optimum value of a "fitness function." According to this technique, a group of chromosomes (a "generation") is first randomly generated, and the fitness function is evaluated for each chromosome. A probability function is then produced to assign a probability value to each of the chromosomes according to its fitness function value, so that a chromosome with a higher fitness function value obtains a higher probability. A "reproduction pool" of chromosomes is then produced by random selection according to the probability function; the members of this reproduction pool are more likely to be selected from the higher fitness function values. A randomly selected chromosome from the reproduction pool then "reproduces" with another, randomly selected, chromosome in the reproduction pool by exchange of genes at a randomly selected "crossover" point in the chromosome. This reproduction is repeated to generate a second generation of chromosomes. Mutation may be introduced by randomly altering a small fraction of the genes in the second generation (e.g., one in one thousand). The fitness function is then evaluated for each of the chromosomes in the second generation, and the reproduction process is repeated until the desired convergence is obtained.

Over the years, researchers have developed many different variants of the original genetic algorithm implementation. The algorithm described above is one implementation that may be used to solve oil field related analysis problems, such as determining material balance in a production operation. A second variant of the genetic algorithm methodology, a so-called "Bit Climber," may also be applied. The Bit Climber provided a solution with accuracy equal to that achieved with the first genetic algorithm procedure and improved computer speed. See Lawrence Davis, *Bit-Climbing, Representational Bias and Test Suite Design*, 1991 Proceedings of the Fourth Int'l Conf. on Genetic Algorithms, U.C. San Diego 18–23, which is hereby incorporated by reference in its entirety.

What is needed, therefore, is a technique of estimating the inverse source wavelet of a seismic shot record for improved accuracy and efficiency in removing high order free surface multiples from the shot record.

SUMMARY OF THE INVENTION

The present invention, accordingly, provides a system and method of estimating the inverse source wavelet of a seismic shot record for improved accuracy and efficiency in removing high order free surface multiples from the shot record, using a stochastic optimization technique, such as a genetic algorithm procedure, that can more readily accommodate non-linear aspects of this problem.

The system and method is applied to a set of measured seismic field data, $D_o(x,t)$, with primary reflections and free surface multiples, where removal of the free surface multiples is determined utilizing an estimate of the inverse of the source wavelet and scale factors made from the seismic data. The system and method automatically optimizes estimates for the inverse of the source wavelet and scale factors.

In one example, a method of producing a primaries-only reflection data set for processing seismic data recordings is performed by randomly generating a first generation of inverse wavelet ($A(t)$) and scale factor strings, each string in the generation representing a possible solution of $A(t)$ and the scale factors for use in an equation to compute a primaries-only reflection data set; determining a fitness function value for each of the strings by evaluating a fitness function, wherein the fitness function comprises the total energy in the estimated primaries-only reflection data set; producing a succeeding generation of inverse wavelet $A(t)$ and scale factor strings according to a variant of a genetic algorithm; repeating the step of determining a fitness function value for each of the strings in the succeeding generation; and identifying the string having a fitness function value meeting a specified criteria, wherein the identified string includes optimized estimates of the inverse wavelet, A(t), and scale factors for use in determining the primaries-only reflection data set. In one aspect, the identifying step of the process further comprises determining whether the predetermined criteria has been satisfied, whereupon the string identification occurs when the criteria has been satisfied.

The process may further include, responsive to determining that the predetermined criteria is not satisfied, repeating the steps of producing a succeeding generation of strings; and determining a fitness function value for each of the strings in the succeeding generation.

In an example embodiment, the invention is implemented as computer program instructions stored on computer-readable media. The program can run on any PC or workstation.

A technical advantage achieved with the invention is accuracy in estimating inverse wavelets and scale factors needed in developing a primaries-only reflection solution heretofore not readily obtainable with traditional estimation techniques. A result of the foregoing is a solution that enables seismic data to be more efficiently analyzed.

Another technical advantage achieved is a substantial reduction in manpower and saving of time normally required to determine estimates of inverse wavelets and scale factors in large sets of data.

DETAILED DESCRIPTION

Figure 1:
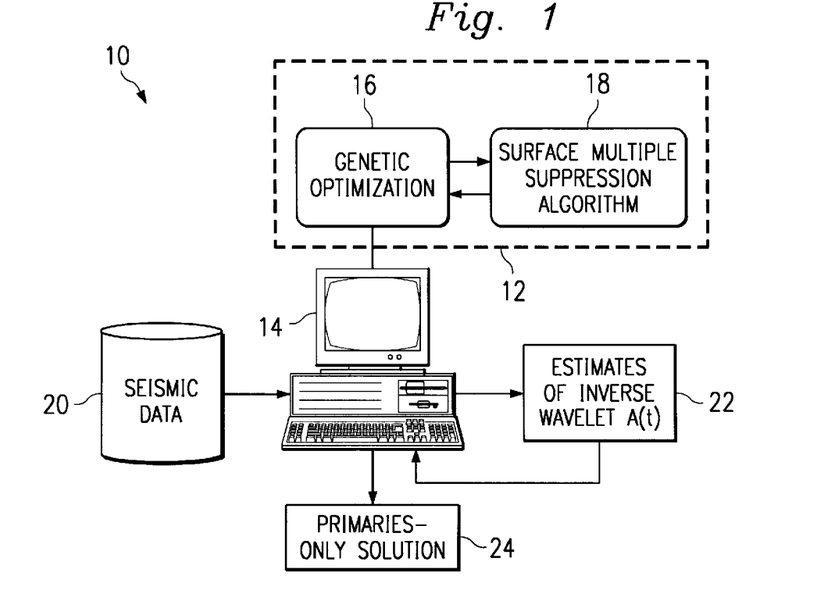
FIG. 1 is a schematic block diagram of system for attenuating high order free multiples from a seismic shot record using a genetic procedure of the present invention.

In FIG. 1, the reference numeral 10 refers to a system of the present invention used for the analysis of seismic data. The system 10 includes one or more programs 12 operatively coupled to a work station 14 for performing functions, described in detail below, relating to attenuating high order free surface multiples from a seismic shot record (shown schematically in FIG. 2a), that uses a genetic procedure to optimize wavelet and scale factors used in the removing the free surface multiples to obtain a primaries-only reflection solution. The work station 14 is a PC, or alternatively a UNIX workstation or the like.

As described in detail below, the work station 14 executes a genetic optimization process 16 and a surface multiple supression process 18, both of which are cooperating modules or programs of the program 12, using seismic data 20 as input thereto. The genetic optimization process 16 iteratively produces estimates 22 of inverse wavelets for the data, until an optimized set of primaries-only seismic data records 24 is obtained based upon an acceptance criteria.

Figure 2A:
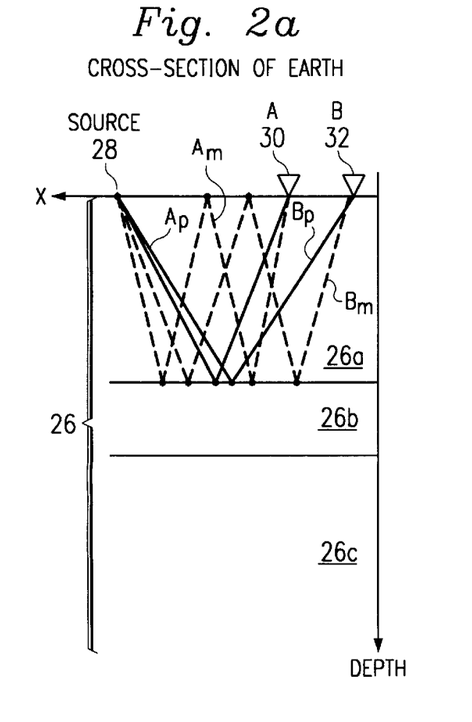
FIGS. 2a and 2b are, respectfully, a schematic cross sectional view of the earth from which seismic records are obtained for input to the system of FIG. 1, and a graphical representation of a corresponding seismic data recording.
Figure 2B:
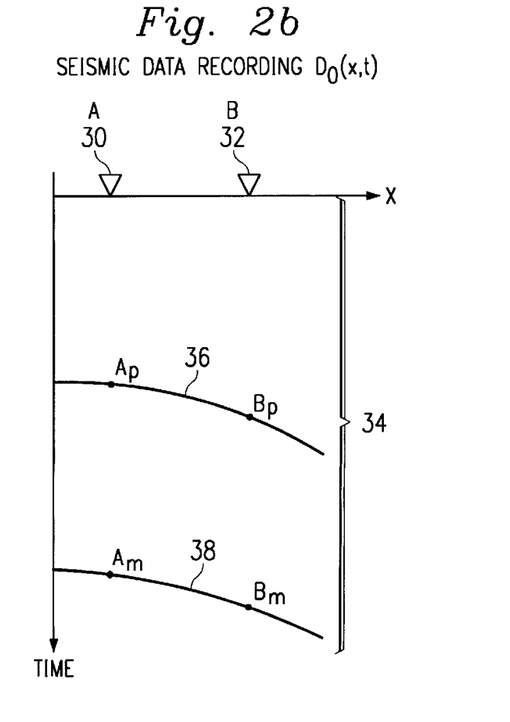

FIGS. 2a and 2b schematically illustrate the environment from which the seismic data 20 is obtained for input to the system 10, along with a corresponding representation of a seismic data recording, $D_o(x,t)$. In FIG. 2a, a cross-section of the earth 26 is shown that includes multiple layers 26a, 26b, 26c. A source 28 generates a seismic shot at the surface of the earth 26 causing energy reflections to be detected at seismic detectors A and B, represented by numerals 30 and 32, respectively. A primary reflection $A_p$, for example, is a reflection of the shot from the interface between the layers 26a, 26b to the surface at the location of the detector 30 (detector A). Similarly, a primary reflection $B_p$, for example, is a reflection of the shot from the interface between the layers 26a, 26b to the surface at the location of the detector 32 (detector B). Unwanted energy reflections are also detected at the detectors 30, 32, in the form of multiple reflections $A_m$ and $B_m$, as examples. The multiple reflections $A_m$, $B_m$ are reflections that are detected as a result of energy being reflected multiple times before reaching a detector, such as from a subsurface interface, to the surface, then back to the subsurface interface, before being detected again at the surface by the detectors 30, 32. The multiple reflections are essentially "noise" that the present system endeavors to remove from the seismic data recording to be analyzed. While not shown, a typical seismic data set comprises many records of reflections recorded at a large number of detectors, and includes orders of multiple reflections that are desired to be removed from the data set.

As shown in FIG. 2b, a simplified schematic of a seismic data recording, $D_o(x,t)$, 34 is illustrated that corresponds to the energy reflections detected at detectors 30, 32 from the earth 26. Curve 36 represents the envelope of arrival times of primary reflection energy, showing the arrival times for primary reflections $A_p$, $B_p$ for detectors 30, 32. Curve 38 represents the envelop of arrival times of multiple reflection energy, showing the arrival times for first order multiple reflections $A_m$, $B_m$. It is understood that higher order multiple reflections, not shown, are normally also included in the data, and that the multiple reflections are removed from the data by operation of the system 10.

The problem to which the system 10 is directed concerns the removal of surface multiple reflections as described above with reference to FIGS. 2a and 2b. The basic problem to be solved is, given a set of measured seismic field data, $D_o(x,t)$, with primary reflections and free surface multiples, calculate a new data set, $D_p(x,t)$, that contains primaries-only reflection events. The removal of the free surface multiples is possible if an estimate the inverse of the source wavelet can be made from the seismic data. The technique is expressed as a series of expansion terms representing different energy contributions to the seismic recording, as set forth in equation (1) below:

$$D_p(t)=D_o(t)+\alpha A(t)*D_1(t)+\beta A(t)*A(t)*D_2(t)+\gamma A(t)*A(t)*A(t)*D_3(t)+ \text{h.o.} \quad (1)$$

where * denotes the convolution operator, α, β and γ are scalar constants and A(t) as shown in equation (2) below is the inverse of the source wavelet, S(t), i.e.:

$$A(t) = \frac{1}{S(t)} \quad (2)$$

The scalar constants should be 1.0 if all scale factors in processing have been properly accounted for, but often they are not. Thus the expression is optionally generalized to include the possibility that unknown scale factors have entered into the processing of the seismic data and need to be determined and removed from the data. As shown in equation (3) below, $D_1(x,t)$ is the first order free surface multiple data that is computed using the wavefield $D_0(x,t)$:

$$D_1(t)=D_0(t)*D_0(t) \quad (3)$$

As indicated in equation (4) below, $D_2(x,t)$ is the second order free surface multiple data that is computed as:

$$D_2(t)=D_0(t)*D_1(t) \quad (4)$$

Higher order free surface multiple wavefields can be computed recursively using the relation as shown in equation (5) below:

$$D_{j+1}(t)=D_o(t)*D_j(t) \quad (5)$$

It is desired to estimate A(t), the inverse of the source wavelet function, given the measured field data, $D_o(x,t)$, and the calculated values of the first order free surface multiple field, $D_1(x,t)$, the second order free surface multiple field, $D_2(x,t)$, and so on. The problem in estimating A(t) lies in the fact that equation (1) is nonlinear in the parameter A(t). This renders conventional linear estimation algorithms useless.

Accordingly, the program 12 estimates the inverse wavelet A(t) using a genetic algorithm optimization algorithm, beginning with the following assumptions. First, it is assumed that A(t) can be adequately represented by the N term z polynomial as expressed in Equation (6) below:

$$A(z) = \sum_{i=0}^{N-1} a_i z^i \quad (6)$$

where the index i runs from 0 to N−1.

Second, the program 12 will terminate the primaries-only wavefield series expansion at the third order term, as expressed in equation (7) below:

$$D_p(t)=D_o(t)+\alpha A(t)*D_1(t)+\beta A(t)*A(t)*D_2(t)+\gamma A(t)*A(t)*A(t)*D_3(t) \quad (7)$$

It is understood that additional higher order terms can be easily added if necessary, with the only penalty being computation time. The measured, field data, $D_o(x,t)$, is available and the first, second and third order free surface wavefields, $D_1(x,t)$, $D_2(x,t)$ and $D_3(x,t)$, have been precomputed using the relations shown in the previous section.

Further, it is assumed that the primaries-only wavefield, $D_p(x,t)$, contains less energy than the measured field data, $D_o(x,t)$.

Based upon the foregoing mathematical construct, the program 12 implements a surface multiple suppression process for estimating A(t) so that the primaries-only solution, wavefield $D_p(x,t)$, is obtained.

Figure 3A:
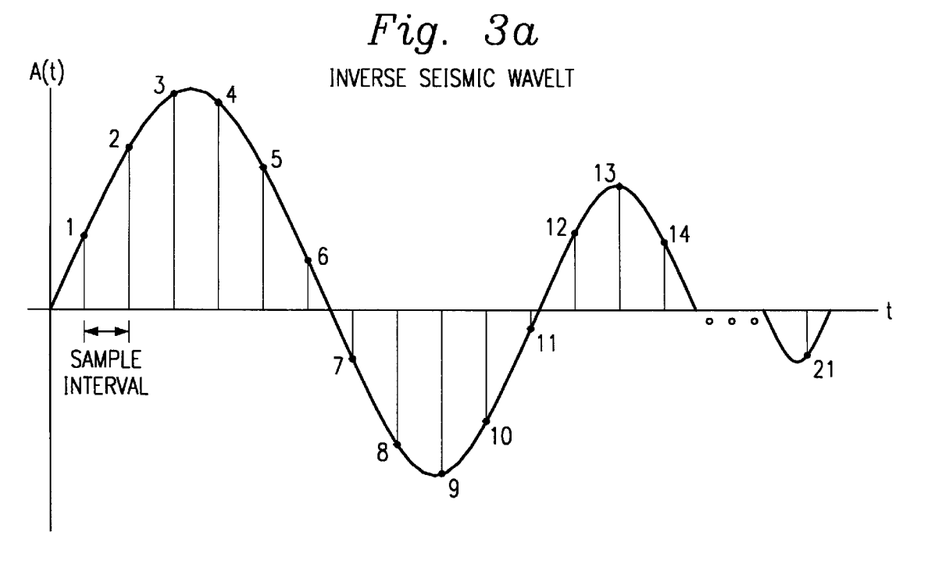
FIGS. 3a and 3b are graphical views of an inverse seismic wavelet end corresponding gene strings for use in the system of FIG. 1, respectively.
Figure 3B:
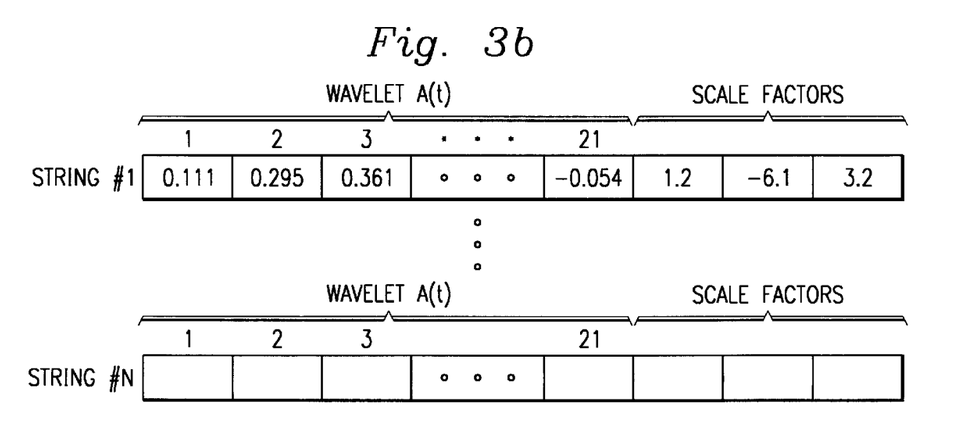

Referring to FIG. 3a, an inverse seismic wavelet A(t) is shown plotted with respect to time, with sample intervals 1–21 indicated, as an example. FIG. 3b illustrates, as will be explained below with regard to a genetic optimization technique, strings 1 through N, each comprising a multiple-gene chromosome with genes 1–21 representing values for sample intervals 1–21 of FIG. 3a for wavelet A(t) and genes a,b,c representing the values for the scale factors used in equation (1) above.

Floating point values are used for the inverse wavelet and scale factors values in the chromosome representation, although alternative values may be utilized. The use of floating point values is preferred, however, because binary bit values would result in a much larger number of chromosome values, and, as can be appreciated, convergence time increases exponentially with the number of chromosome values.

Figure 4:
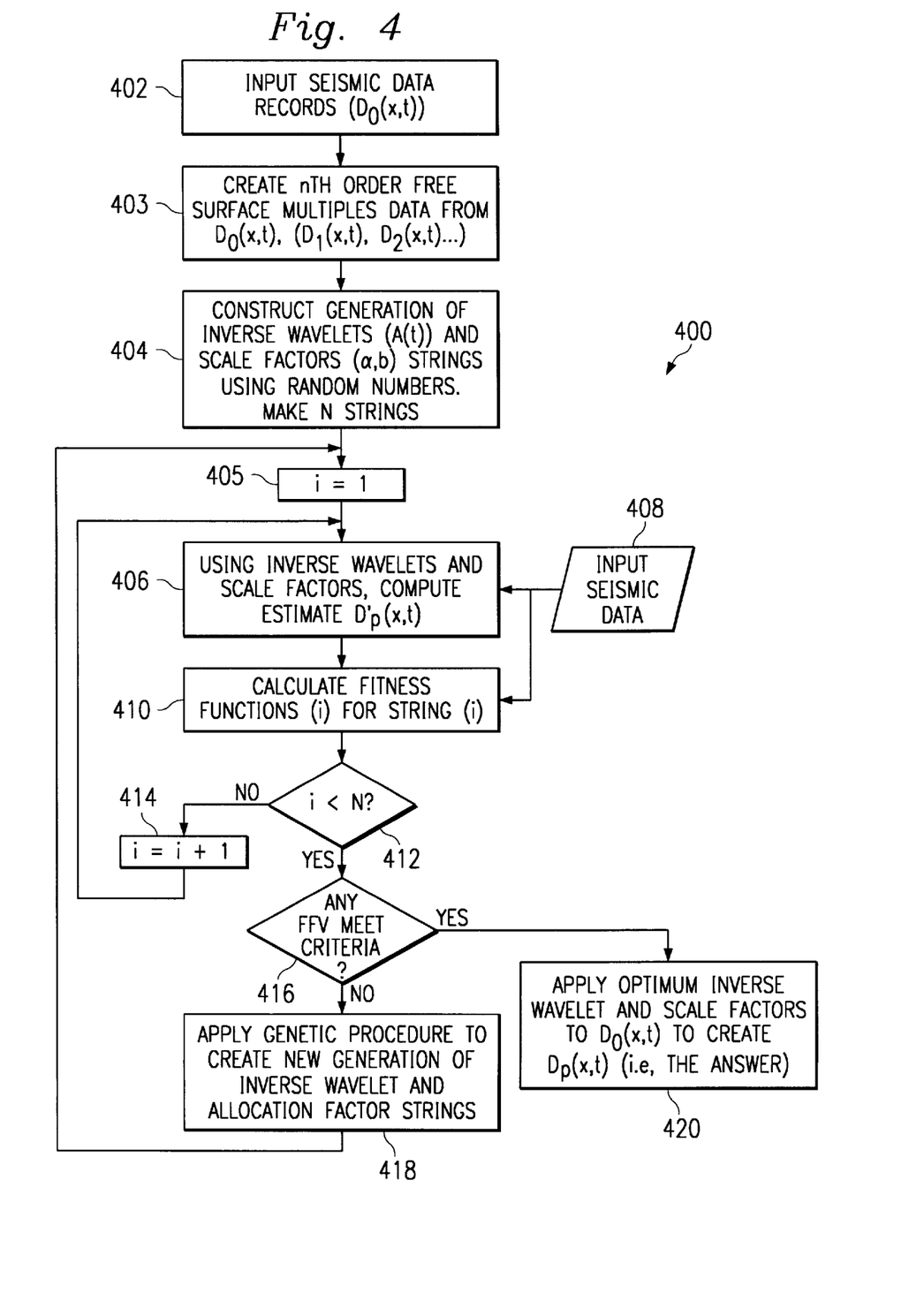
FIG. 4 is a process control flow diagram of the system of FIG. 1.

FIG. 4 is a process control flow diagram 400 illustrating operation of the system 10. The diagram 400 illustrates operation of the program 12 to estimate the inverse wavelet A(t) and scale factors using a genetic optimization algorithm, used in removing the free surface multiples to obtain a primaries-only reflection solution, $D_p(x,t)$.

Referring also to FIG. 1, components are shown for the process control of the system 10 as presented in FIG. 4. While not shown, it is understood that operation of the system 10 is implemented by user commands and programming instructions executed on the computer 14. The genetic optimization process 16 is executed, in one embodiment, by software programs running on the computer 14 under the direction of an appropriate computer operating system (not shown).

Referring now to FIG. 4, in step 402 seismic data records ($D_o(x,t)$) are input. In step 403, nth order free surface multiples (e.g., $d_1(x,t)$, $d_2(x,t)$ . . . $d_n(x,t)$) are created from $D_o(x,t)$. In step 404, a generation of inverse wavelets (A(t)) and scale factor strings are constructed, using random numbers. N strings are made. Again, the values included in the string are chosen at random and do not need to represent actual data. The number of strings to be included in the generation is chosen based upon some predetermined criteria.

In one example, the construction of the initial population of chromosomes in step 404 can be expressed as follows. Each chromosome in a population $P_j$ consists of a length N $\alpha_i$ vector plus the three scalar values, for a total of N+3 parameters. Initial values for each parameter are assigned using a random number generator. This population may be referred, in the fitness function calculation discussed below, as population $b_{ij}$. The index j runs from 1 to M, where M is the total number of individuals in the population, and the temporal index i, which references one possible set of coefficients $\alpha_i$, runs from 0 to N−1.

In steps 405–412, a fitness function is applied to each string of allocation factors such that each string in the generation is given a fitness function value. Thereafter, in steps 416 and following, a genetic optimization process is iteratively applied to the strings until a string is identified that has a fitness function value meeting an acceptance criteria. A string, meeting the acceptance criteria, defines near optimum inverse wavelet and scale factors that are applied to $D_o(x,t)$ to create $D_p(x,t)$, the primaries-only solution, which are output in step 420.

More specifically, in step 405, a counter (i) is set (to a value of 1) that represents the string upon which subsequent steps are then performed. In step 406, using the inverse wavelets and scale factors, an estimate is computed of the primaries-only solution, $D'_p(x,t)$. In step 408, seismic data is input for the computation in step 406.

In step 410, a fitness function is performed for the string (i) to determine a fitness function value ($FFV_i$). The fitness function is used to determine how good the estimates 22 of inverse wavelet (A(t)) are that have been generated by the genetic optimization process 16. The output ($FFV_i$) of the fitness function calculation for a given string (i) (i.e., chromosome) is a measure of how fit the string solution is for the current environment, and how likely it is that the solution will survive and propagate its genetic content into the next generation of solutions (subsequently described with reference to step 418).

In one example, the fitness function is computed as follows. For each value of j from 1 to M, the fitness value, $F_j$, is computed for each number of the population using the following fitness function as set forth in equation (8):

$$F_j = \sum_{X=X_0}^{X_{max}} \left\{ \sum_{t=0}^{T_{max}} [D_o(x, t) + \alpha b_{ij} * D_1(x, t) + \beta b_{ij} * b_{ij} * D_2(x, t) + \gamma b_i j * b_{ij} * b_{ij} * D_3(x, t)]^2 \right\} \quad (8)$$

where t=0 and $T_{max}$ are the starting and ending times for the evaluation window on each trace. In general, these window times are a function of the source-receiver offset distance, X, which ranges from $X_0$ to $X_{max}$. The second, outer, summation, adds together all the residual energies from each trace in the shot record. The * symbol is the convolution operator. $F_j$ is then the total residual energy for the shot record after removal of free surface multiples. The algorithm will be seeking the minimum $F_j$ as the solution.

In step 416, a determination is made if the fitness function criteria are met. For example, is $F_j$< a user specified minimum cutoff criteria? If yes then quit and go to step 420. If no, go to step 418 and, based on the fitness values $F_j$, compute a new population of solutions, $P'_j$, using the genetic operators of combination and mutation.

Referring to step 412, once the fitness function is determined for the string (i), yielding a fitness function value, FFV(i), it is determined if the string (i) is the last string (N) in the generation and, if so, execution proceeds to step 416. If string (i) is not the last in the generation, in step 414, the value of (i) is incremented and steps 406–412 are repeated for the next string (i+1) to determine its fitness function, and so on, until the fitness functions are determined for all the strings (1 through N) in the generation.

As indicated above, in step 418, a genetic procedure is applied to the strings, thus constructing a new generation of strings upon which to apply the steps 405–416. The genetic procedure after many iterations through steps 405–416 eventually produces a string with a FFV meeting the acceptance criteria, thereby producing an output of optimum inverse wavelet and scale factors in step 420.

Figure 5:
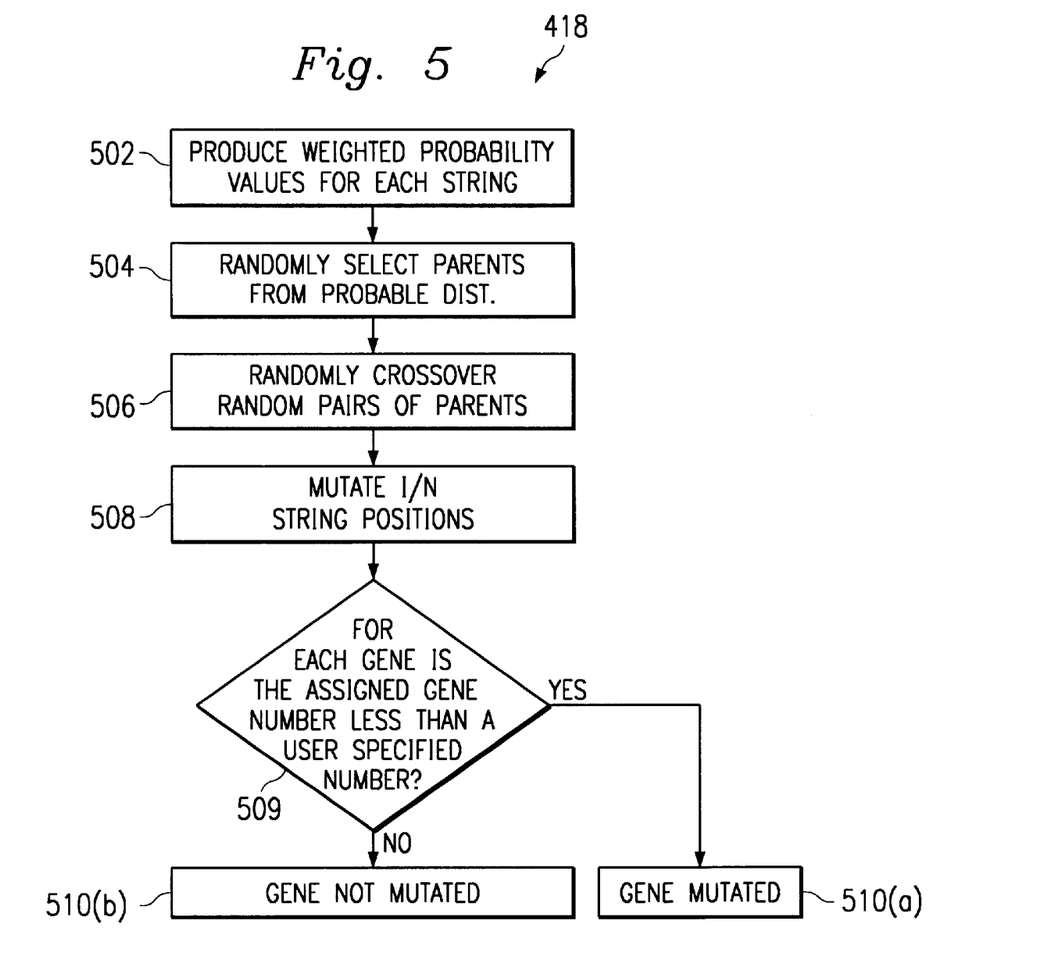
FIG. 5 is a process flow diagram of the genetic procedure used in the system of FIG. 1.

FIG. 5 is a flow chart illustrating details of the step 418 genetic procedure. According to genetic algorithm techniques, as illustrated with reference to steps 502–508, the new generation of wavelet and scale factor strings (i.e., chromosomes) are randomly selected from the prior generation according to a probability function that affords greater likelihood of selection to sequences having lower (i.e., better) fitness function values FFV. Conversely, the likelihood of selecting a high fitness function value string (i.e., worse) is to be relatively low. According to one example, in step 502 the probabilities of selection are determined using a "rigged roulette wheel" technique in which the chances of selecting a string are weighted to be greater if the FFV for that string is lower, i.e., better than that of other strings.

In step 504, following assignment of the probabilities, reproduction candidate strings, or "parents", for the next generation of strings to be produced are selected. The number of parents selected equals the number of strings originally constructed in the first generation, but the parent strings are selected from the set of valid sequences for which probabilities are calculated, preferably in a random manner, but according to the probabilities calculated, as shown in the above example. This ensures that strings with lower fitness function values, FFV, are thus more likely to become parents for the succeeding generation; as such, the genetic algorithm models the theory of natural selection.

In step 506, after selection of the parent strings in step 504, a reproduction process is performed to produce the next generation of strings by randomly selecting pairs of parent strings and performing a "crossover" operation at a randomly selected position within the strings, thus creating new strings for evaluation.

Step 506 would produce two "offspring" strings for the next generation by randomly selecting a crossover point, and by then swapping the numbers on one side of the crossover point with those numbers from the other parent string. Many types of crossover techniques known in the art may alternatively be used, some of which are described in David E. Goldberg, Genetic Algorithms in Search, Optimization, and Machine Learning 170 et. seq. (1989).

Referring now to steps 508–510(b), it is known in the genetic algorithm field that "mutations" are useful to avoid trapping of the optimization at a local maximum, as such mutations encourage diversity in the offspring. Accordingly, in this example, a mutation is performed upon the strings of step 506, by changing, to a different value, randomly selected ones of the numbers as determined by a random number generator by adding a randomly generated number to the selected number. In particular, in step 508, a random number is assigned to every gene in every chromosome. In step 509, for each gene, a determination is made whether the assigned gene number is less than a user-specified number. If so, execution proceeds to step 510(a), in which the gene is mutated to a random number between 0 and 1. Otherwise, execution proceeds to step 510(b) and the gene is not mutated.

Following the completion of step 510(a) or (b), a new generation of new strings has been produced and is ready for evaluation via the processes of FIG. 4, described above. The evaluation of the fitness function values, FFV, for this new generation is then performed, and the process continued until decision 416 determines that convergence to an optimal string has occurred. Output step 420 then presents an indication on the computer 14 to advise the human operator of the optimal assignment of wavelet and scale factors.

As discussed previously, there are many variants of the basic genetic algorithm procedure that have been developed by researchers over the years. One such variant is a modification of, or form of, a bit climber (the "Bit Climber"). The Bit Climber employs the same genetic structure for the unknown parameters as described previously, however, only one gene is created. Initially, the values for each parameter in this gene are assigned random values. Each parameter value is represented as a binary string of a. given length, e.g., 10 bits. Associated with each bit in the parameter value is a "bit change" probability function. The bit change probability function is a number between 0 and 1 and describes the probability that a bit, if selected, will be permitted to change. Typically, within the 10 bits used to describe a single parameter value, the high order bits are assigned a lower probability value than the low order bits. This has the effect of preferentially allowing the low order bits to change.

In operating the Bit Climber, one bit location somewhere in the gene is randomly selected, and its value is flipped (i.e., if the selected bit is a 0, then it is changed to a 1 and vice versa) if a randomly generated number between 0 and 1 is less than a preassigned bit change probability value for the selected bit. The modified gene is then evaluated using the same fitness functions previously described. If the fitness function evaluation indicates that the modified gene is superior to the original gene, then the new state of the changed bit is retained. If the fitness function evaluation indicates that the modified gene is poorer than the original gene, then the changed bit is returned to its original value. If a selected bit is flipped, then its bit change probability function is modified to a lower value so that if this same bit location is randomly selected again, it is less likely that the bit will be flipped. After a large number of iterations of the above-described operations, the Edit Climber may become trapped in a local minimum that prevents it from attaining improved solutions. In this case the program will restore the bit change probability functions for each parameter value to the initial starting, conditions so that bits can more easily be modified.

Furthermore, if after a large number of iterations of the procedure described in the previous paragraph the Bit Climber has not reached a satisfactory solution, the bit change probability functions for all parameter value will be modified, so that the bit change probability function value for every bit in the gene is equal to 1. This insures that any selected bit in the gene will be flipped in subsequent iterations.

EXAMPLE

The feasibility of removing high order free surface multiples from a seismic shot record using a genetic algorithm has been demonstrated using, synthetic seismic data. The genetic algorithm was employed to estimate the inverse of the seismic wavelet; this inverse wavelet was then used to remove free surface multiples from the seismic recording. Current research demonstrated that a genetic algorithm can attenuate free surface multiples of varying orders from synthetic seismograms. In cases where primary and multiple energy are contemporaneous, there was substantial attenuation of the primary energy when the nonbandlimited inverse wavelet from the genetic algorithm was used.

A set of synthetic seismic data was generated to evaluate the ability of a genetic algorithm to remove surface multiples. The genetic algorithm estimates the inverse source wavelet using scattering theory predictions of surface-related multiples. The inverse wavelet estimation employs higher-order terms in the scattering theory, and requires a nonlinear estimation of the waveform using the synthetic data.

Figure 6A:
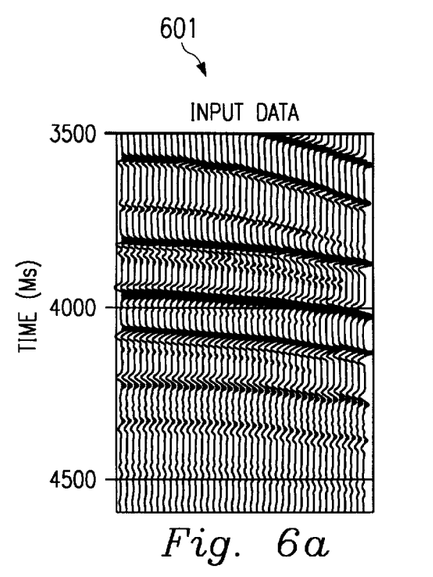
FIGS. 6a and 6b are, respectfully, a graph illustrating an example original synthetic seismic data record, and an output record after application of the nonbandlimited inverse wavelet derived by the genetic algorithm.
Figure 6B:
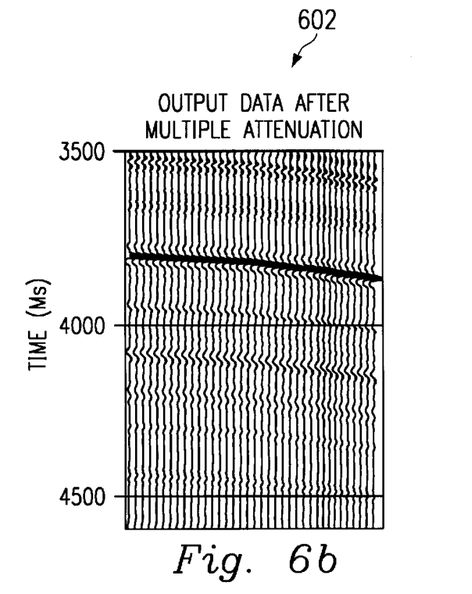

Referring to FIGS. 6a and 6b, respectfully, there is shown an original synthetic seismic data record 601 and an output record 602 after application of the nonbandlimited inverse wavelet derived by the genetic algorithm.

In the record 601, the synthetic seismic data set contained several primaries each of which is accompanied by many orders of surface peg-leg multiples. The subsurface model roughly corresponds to the Shearwater field in the Central Graben of the North Sea. The synthetic data consisted of a single shot record of 160 traces, 5 seconds long, 4 ms sample interval and 12.5 meter trace spacing (see FIG. 6a, showing 40 traces, one second long). Two additional records were generated that consisted of the synthetic shot record convolved once and twice respectively with a truncated version of the shot data that contains only the water bottom reflection.

Experiments were concerned with preserving primary reflections in portions of the synthetic data where multiple and primary energy were arriving simultaneously. The experiments showed the near total suppression of a primary reflection whose arrival time was about the same as a surface multiple. These seismic events arrive at about 4000 ms on the left record 601 in FIG. 6a. The right record 602, in FIG. 6b, showing the result of applying the nonbandlimited inverse wavelet derived by the genetic algorithm, clearly illustrates that both primary and multiple energy have been attenuated.

Figure 7A:
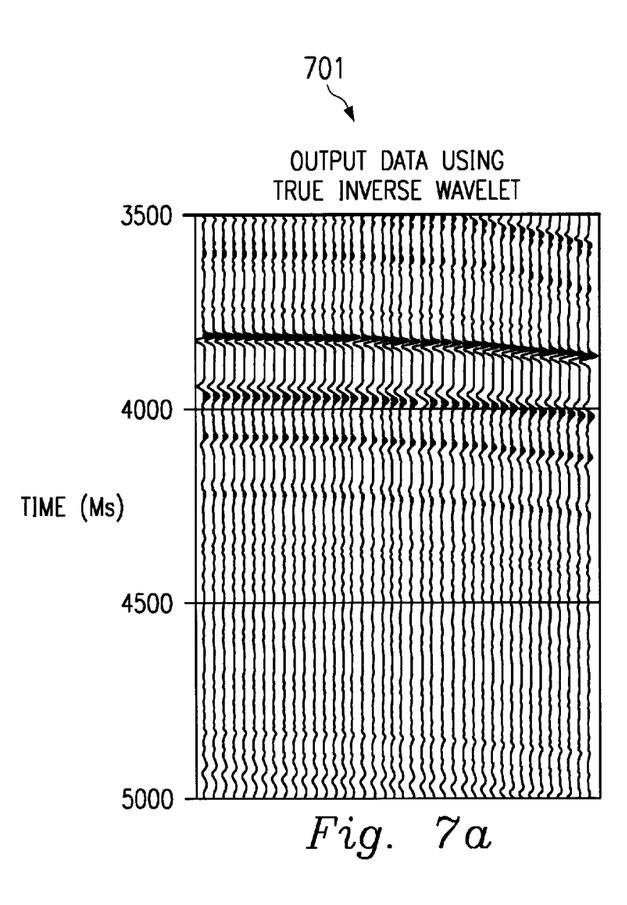
FIGS. 7a and 7b, are graphs illustrating an example comparison of data after multiple removal, with FIG. 7a showing an output record resulting from the application of the true inverse wavelet, and FIG. 7b showing an output record resulting from the application of a bandpass filtered version of the inverse wavelet derived from the genetic algorithm.
Figure 7B:
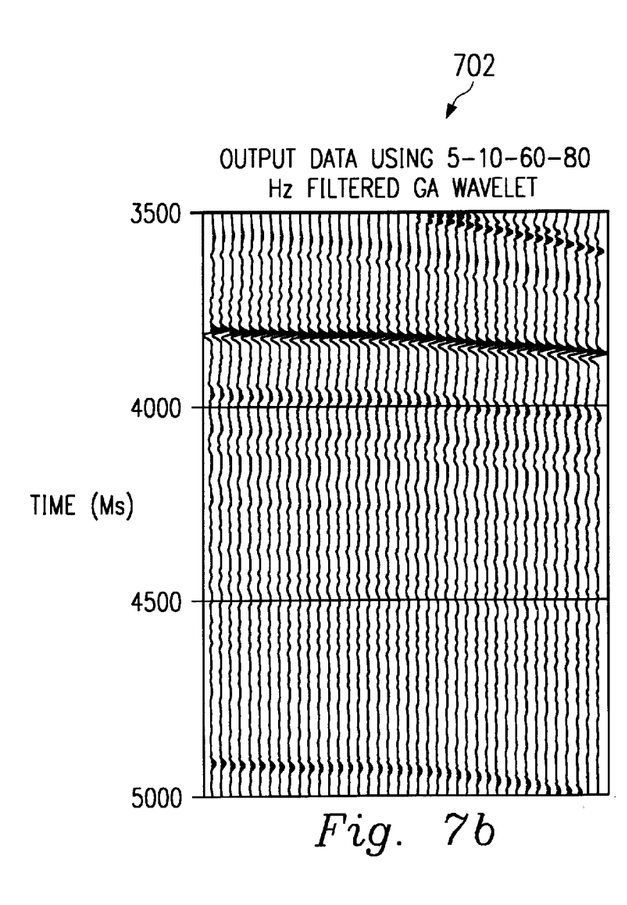

Referring to FIGS. 7a and 7b, there is illustrated a comparison of data after multiple removal. The output record 701, in FIG. 7a, is a record resulting from the application of the true inverse wavelet. The output record 702, in FIG. 7b, is a record resulting from the bandpass filtered version of the inverse wavelet derived by the genetic algorithm.

The nonbandlimited inverse wavelet computed by the genetic algorithm was bandlimited using a 5–10–60–80 Hz Butterworth bandpass filter to approximately match the original frequency content of the synthetic seismic data. This bandlimited version of the inverse wavelet was applied to the data and the results are plotted in the record 702, FIG. 7b. The scale factor (0.307) for the second term that was derived by the genetic algorithm was applied in this figure, even though at about 20% larger than the theoretically correct value of 0.25. As can be seen here the degradation of the second primary event at about 4000 ms is less than that shown in FIG. 6b. For comparison, the record 701, in FIG. 7a, is an application of the "true" inverse wavelet to the synthetic data. Close examination shows that there is better retention of primary energy using the "true" inverse wavelet.

Figure 8A:
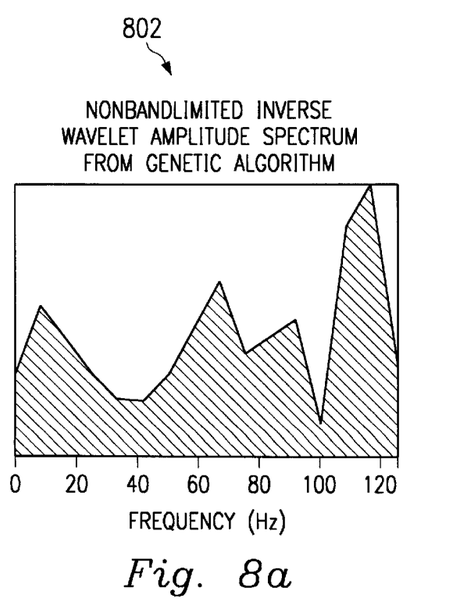
FIGS. 8a and 8b are, respectfully, an example plot of the Fourier amplitude spectra of the genetic algorithm-derived, and the true inverse wavelets.
Figure 8B:
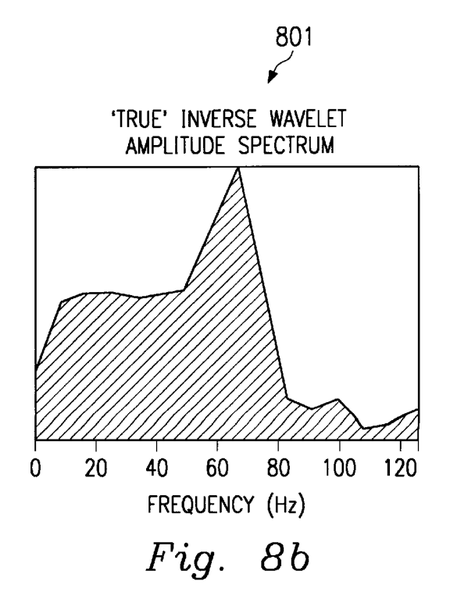

FIGS. 8a and 8b, respectfully, illustrate a plot of the Fourier amplitude spectra of the 'true' (graph 801, FIG. 8b) and the genetic algorithm-derived (graph 802, FIG. 8a) inverse wavelets. From this figure it is immediately obvious that the genetic algorithm derived inverse wavelet contains a large amount of energy outside the passband of the data (5–10–60–80 Hz).

It has been observed that the method described hereinabove can be performed quickly by data processing equipment having modest performance by modern standards (e.g., on the order of a few seconds using a 486-based personal computer). Accordingly, the present invention may be readily and inexpensively implemented at remote locations, such as in the field.

It is understood that the present invention can take many forms and embodiments. The embodiments shown herein are intended to illustrate rather than to limit the invention, it being appreciated that variations may be made without departing from the spirit of the scope of the invention. For example, any number of different threshold criteria may be established for accuracy in the estimates of wavelet and scale factors. Alternative approaches may be used for selecting the "parent" strings to use for creating subsequent generations. Variations may be made in the organization and functions of software modules used to implement the processes performed by the system 10. The processes may be organized into any number of different modules or computer programs for operation on one or more processors or work stations. The techniques of the present invention may also apply to analyses other than those of the preferred embodiment. The programs may be implemented in any appropriate programming language and run in cooperation with any computer system or tool.

Although illustrative embodiments of the invention have been shown and described, a wide range of modification, change and substitution is intended in the foregoing disclosure and in some instances some features or the present invention may be employed without a corresponding use of the other features. Accordingly, it is appropriate that the appended claims be construed broadly and in a manner consistent with the scope of the invention.

What is claimed is:

1. A method of producing a primaries-only reflection data set for processing seismic data recordings, comprising the steps of:

randomly generating a first generation of inverse wavelet (A(t)) and scale factor strings, each string in the generation representing a possible solution of A(t) and the scale factors for use in an equation to compute a primaries-only reflection data set;

determining a fitness function value for each of the strings by evaluating a fitness function, wherein the fitness function comprises the total energy in the estimated primaries-only reflection data set;

producing a succeeding generation of inverse wavelet A(t) and scale factor strings according to a variant of a genetic algorithm;

repeating the step of determining a fitness function value for each of the strings in the succeeding generation; and identifying the string having a fitness function value meeting a specified criteria, wherein the identified string includes optimized estimates of the inverse wavelet A(t) and scale factors for use in determining the primaries-only reflection data set.

2. The method of claim 1 wherein the identifying step further comprises determining whether the predetermined criteria has been satisfied, whereupon the string identification occurs when the criteria has been satisfied;

and further comprising:

responsive to determining that the predetermined criteria is not satisfied, repeating the steps of producing a succeeding generation of strings; and determining a fitness function value for each of the strings in the succeeding generation.

3. The method of claim 1 wherein the step of producing a succeeding generation of allocation factor strings comprises:

creating a probability value for each of the inverse wavelet and scale factor strings in first generation by determining the fractional contribution of each string in the generation to the sum of the fitness function values for the strings in the generation;

selecting parent sequences from the first generation according to the probability values;

randomly selecting pairs of parent strings; and crossing over the selected pairs of parent strings relative to one another at a randomly selected value position to produce the succeeding generation.

4. The method of claim 1 wherein the variant of the genetic algorithm is a Bit Climber.

5. A computer program for producing a primaries-only reflection data set for processing seismic data recordings, the program stored on a computer readable media, comprising:

instructions for generating a first generation of inverse wavelet (A(t)) and scale factor strings, each string in the generation representing a possible solution of A(t) and the scale factors for use in an equation to compute a primaries-only reflection data set;

instructions for determining a fitness function value for each of the strings by evaluating a fitness function, wherein the fitness function comprises the total energy in the estimated primaries-only reflection data set;

instructions for producing a succeeding generation of inverse wavelet A(t) and scale factor strings according to a variant of a genetic algorithm;

instructions for repeating the step of determining a fitness function value for each of the strings in the succeeding generation; and instructions for identifying the string having a fitness function value meeting a specified criteria, wherein the identified string includes optimized estimates of the inverse wavelet A(t) and scale factors for use in determining the primaries-only reflection data set.

6. The program of claim 5 wherein the instructions for identifying further comprise instructions for determining whether the predetermined criteria has been satisfied, whereupon the string identification occurs when the criteria has been satisfied;

and further comprising:

instructions, responsive to determining that the predetermined criteria is not satisfied, for repeating producing a succeeding generation of strings; and determining a fitness function value for each of the strings in the succeeding generation.

7. The program of claim 5 wherein the instructions for producing a succeeding generation of allocation factor strings comprises:

instructions for creating a probability value for each of the inverse wavelet and scale factor strings in first generation by determining the fractional contribution of each string in the generation to the sum of the fitness function values for the strings in the generation;

instructions for selecting parent sequences from the first generation according to the probability values;

instructions for randomly selecting pairs of parent strings; and instructions for crossing over the selected pairs of parent strings relative to one another at a randomly selected value position to produce the succeeding generation.

8. A system for producing a primaries-only reflection data set for processing seismic data recordings, comprising:

means for generating a first generation of inverse wavelet (A(t)) and scale factor strings, each string in the generation representing a possible solution of A(t) and the scale factors for use in an equation to compute a primaries-only reflection data set;

means for determining a fitness function value for each of the strings by evaluating a fitness function, wherein the fitness function comprises the total energy in the estimate d primaries-only reflection data set;

means for producing a succeeding generation of inverse wavelet A(t) and scale factor strings according to a variant of a genetic algorithm;

means for repeating the determining of a fitness function value for each of the strings in the succeeding generation; and means for identifying the string having a fitness function value meeting a specified criteria, wherein the identified string includes optimized estimates of the inverse wavelet A(t) and scale factors for use in determining the primaries-only reflection data set.

9. The system of claim 8 wherein the means for identifying further comprise means for determining whether the predetermined criteria has been satisfied, whereupon the string identification occurs when the criteria has been satisfied;

and further comprising:

means responsive to determining that the predetermined criteria is not satisfied for repeating producing a succeeding generation of strings; and determining a fitness function value for each of the strings in the succeeding generation.

10. The system of claim 8 wherein the means for producing a succeeding generation of allocation factor strings comprises:

means for creating a probability value for each of the inverse wavelet and scale factor strings in first generation by determining the fractional contribution of each string in the generation to the sum of the fitness function values for the strings in the generation;

means for selecting parent sequences from the first generation according to the probability values;

means for randomly selecting pairs of parent strings; and means for crossing over the selected pairs of parent strings relative to one another at a randomly selected value position to produce the succeeding generation.

* * * * *